(12) United States Patent
Poulsen

(10) Patent No.: US 8,733,778 B2
(45) Date of Patent: May 27, 2014

(54) ARRANGEMENT FOR THE TRANSPORT OF WIND TURBINE COMPONENTS

(75) Inventor: Henning Poulsen, Skjern (DK)

(73) Assignee: Siemens Aktiengesellschaft, München (DE)

( * ) Notice: Subject to any disclaimer, the term of this patent is extended or adjusted under 35 U.S.C. 154(b) by 130 days.

(21) Appl. No.: 12/954,982

(22) Filed: Nov. 29, 2010

(65) Prior Publication Data

US 2011/0148072 A1     Jun. 23, 2011

(30) Foreign Application Priority Data

Nov. 30, 2009   (EP) .................................... 09014850

(51) Int. Cl.
*B60P 3/40* (2006.01)
*B62D 33/02* (2006.01)

(52) U.S. Cl.
CPC ................................. *B62D 33/0207* (2013.01)
USPC .......................................... 280/404; 414/458

(58) Field of Classification Search
USPC .......................................................... 280/404
See application file for complete search history.

(56) References Cited

U.S. PATENT DOCUMENTS

| | | | |
|---|---|---|---|
| 2,776,146 A | 1/1957 | Marino | |
| 5,129,779 A | 7/1992 | Triplett | |
| 6,371,505 B1 * | 4/2002 | Turner, II | 280/441.2 |
| 6,821,066 B2 | 11/2004 | Wehrli | |
| 2004/0213643 A1 | 10/2004 | Wehrli | |
| 2005/0123382 A1 * | 6/2005 | Christensen et al. | 414/373 |

FOREIGN PATENT DOCUMENTS

| | | |
|---|---|---|
| CN | 2182117 Y | 11/1994 |
| CN | 201291925 Y | 8/2009 |
| DE | 1234543 | 2/1967 |
| DE | 1237449 | 3/1967 |
| DE | 7401022 | 4/1974 |
| EP | 1622792 B1 | 11/2008 |
| JP | 54144610 A | 11/1979 |
| JP | 60229835 A | 11/1985 |
| WO | 2004101313 A1 | 11/2004 |
| WO | WO 2004101313 A1 * | 11/2004 |
| WO | WO 2008104185 A1 | 9/2008 |

* cited by examiner

*Primary Examiner* — Tony H. Winner
*Assistant Examiner* — Jacob Knutson

(57) ABSTRACT

A system for the transportation of wind turbine components with a vehicle, especially for the transportation of large wind turbine components, is provided. The vehicle includes at least two wheelsets, a first end frame connected to a first wheelset and a second end frame connected to a second wheelset. The vehicle further includes a support structure for carrying at least one wind turbine component, wherein the support structure is adapted to be detachably connected to the first end frame and/or to the second end frame. Thereby, the wind turbine component is connected solely to the support structure in a fixed but detachable manner.

10 Claims, 2 Drawing Sheets

ARRANGEMENT FOR THE TRANSPORT OF WIND TURBINE COMPONENTS

CROSS REFERENCE TO RELATED APPLICATIONS

This application claims priority of European Patent Office Application No. 09014850.3 EP filed Nov. 30, 2009, which is incorporated by reference herein in its entirety.

FIELD OF INVENTION

The present invention relates to a system for the transportation of wind turbine components, especially for the transportation of large wind turbine components.

BACKGROUND OF INVENTION

Generally, large wind turbine components like nacelles or tower segments are transported by special transportation vehicles for instance from the production plant to the site of erection or to a harbour if the erection site is located offshore.

Due to the different shapes and dimensions of wind turbine components, specifically adapted vehicles have to be provided for transporting securely the different types of components.

An example of such a vehicle is shown in FIG. 3. The vehicle comprises a trailer tractor and a long stiff trailer which is adapted to carry wind turbine nacelles. The main drawback of these prior art systems resides in the fact that the provision of different vehicles implies a greater logistical effort and is expensive.

It is further known in the art to use a trailer tractor and a trailer for transporting a wind turbine component and to place the component between these two. Thereby, the trailer tractor and the trailer are connected via the component. As a result, the component forms part with the transportation vehicle. This prior art system has the disadvantage that forces applied to the vehicle are received by the component which might be damaged consequently.

SUMMARY OF INVENTION

It is an object of the present invention to provide an improved arrangement for transporting wind turbine components, in particular large wind turbine components.

The object is achieved by a vehicle for transporting wind turbine components according to the independent claim. Further aspects of the invention are subject of the dependent claims.

The arrangement comprises a vehicle and the vehicle comprises at least two wheelsets and an adapter system. The adapter system comprises a first end frame which is connected to a first wheelset of the vehicle and a second end frame which is connected to a second wheelset of the vehicle. Furthermore, the adapter system comprises a support structure which is adapted and used to carry at least one wind turbine component. The support structure is detachably connected to the first end frame and/or to the second end frame and the wind turbine component is solely connected to the support structure in a fixed but detachable manner.

Advantageously, forces applied to the vehicle are transmitted to the adapter system instead of being transmitted to the wind turbine component. Thus, damages to the component are avoided.

The vehicle can transport different types of components which allows for more flexibility and cost reductions compared to prior art systems.

Moreover the combination of the at least two wheelsets and the adapter system does not have to be a stiff construction. It may be flexible instead and allow for a good manoeuvrability of the vehicle.

Another advantage of the inventive system resides in the fact that a wind turbine component can easily be reloaded to another transportation system like a ship, a plane, a truck or a railway vehicle while remaining connected to a support structure.

In a preferred embodiment of the invention, the first end frame is fixed but detachable connected to the first wheelset of the vehicle and the second end frame is fixed but detachable connected to the second wheelset of the vehicle. Therefore, the two end frames can be used in conjunction with individually selected support structures wherein the selection of the support structure depends on the wind turbine component to be carried.

BRIEF DESCRIPTION OF THE DRAWINGS

The invention will be described by way of example in more detail in the following with reference to the drawings, in which.

DETAILED DESCRIPTION OF INVENTION

Figure 1:
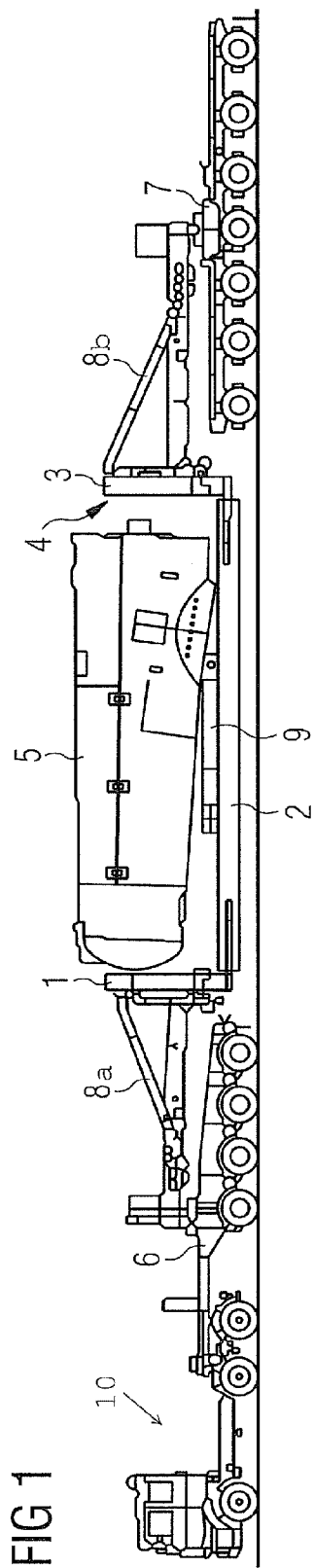
FIG. 1 shows a system for the transport of wind turbine components according to the invention.

FIG. 1 shows a system for the transport of wind turbine components according to the invention comprising a vehicle. The vehicle comprises a tractor unit 10 being used for hauling trailers. The tractor unit 10 may be a standard tractor trailer used for various purposes, a railway engine for transporting the components by rail or another towing vehicle.

The tractor unit 10 is detachably connected to a first trailer 6. This first trailer 6 is connected to an adapter system 4 and the adapter system 4 is further connected to a second trailer 7.

According to the invention, the adapter system 4 comprises a first end frame 1, a support structure 2 and a second end frame 3. The first end frame 1 is connected to the support structure 2 and the support structure 2 is further connected to the second end frame 3. Hence, the two end frames 1, 3 are connected at opposite ends of this support structure 2.

The support structure 2 by itself may comprise a supporting plate or a supporting frame and is adapted to carry large wind turbine components 5.

At least one wind turbine component 5 is solely connected to the support structure 2. Thereby, the component 5 is either connected to the support structure 2 in a fixed but detachable manner or it simply rests on this support structure 2.

The system according to the invention has the advantage that forces applied to the transportation vehicle, for instance tractive forces, are transmitted to the adapter system 4. Thus, the forces are not transmitted to the wind turbine component 5 to be carried which avoids damages of the component 5.

In a preferred embodiment of the invention, the end frames 1, 3 are detachably connected to the wheelsets 6, 7.

Thus, a set of end frames 1, 3 can be used in conjunction with an individually selected support structure 2, wherein the selection of the support structure 2 depends on the wind turbine component 5 to be carried.

In a further preferred embodiment of the invention, at least one of the connections of adapter system 4 and trailer 6, 7 is designed as resilient connection which allows for absorbing forces applied to the vehicle.

In a further preferred embodiment of the invention, at least one of the connections of the adapter system 4 to a trailer 6, 7 is designed to allow swiveling movements which enhances the maneouvrability of the vehicle.

In yet a further preferred embodiment of the invention, the trailers 6,7 comprise positioning means 8a,8b. The tracking unit 10 can also comprise positioning means although that is not shown in the drawings.

These positioning means 8a, 8b are adapted to change the position of the component 5, like lowering or lifting the component 5 referred to a reference axis or referred to a reference area. It is even possible to turn the component around a reference axis to provide a turning movement. The positioning means 8a, 8b comprise hydraulic and/or electric and/or pneumatic means.

Positioning means 8a, 8b for vertically lifting and/or lowering the component 5 are shown in FIG. 1. Thereby, the first trailer 6 is connected to a first positioning means 8a and the first positioning means 8a is connected to the first end frame 1. The two connections are fixed but detachable connections. The second trailer 7 is connected to a second positioning means 8b and the second positioning means 8b is connected to the second end frame 3. Thereby, both connections are fixed but detachable connections.

This preferred embodiment has the advantage that forces applied to the vehicle can be absorbed by the positioning means 8a, 8b especially if the positioning means 8a, 8b comprise resilient structural elements. Besides, the positioning means 8a, 8b allow for raising, lowering or turning the wind turbine component 5 during transport to overcome obstacles on the route.

Moreover, the attachment of the end frames 1, 3 to the support structure 2 as well as the detachment of the end frames 1, 3 from the support structure 2 is facilitated by using the positioning means 8a, 8b which allows for easily loading and/or unloading the vehicle.

In a further embodiment of the invention, the two trailers 6, 7 provide connecting means for connecting them directly to each other for further transport of the unloaded vehicle.

In yet a further embodiment of the invention, loading the wind turbine component to the vehicle comprises the following steps. The wind turbine component 5 is first connected separately to the support structure 2.

After that, the first end frame 1 is detachably attached to the first trailer 6 and the second end frame 2 is detachably attached to the second trailer 7.

Then, the end frames 1, 3 are connected to the support structure and the support structure 2 is subsequently lifted up. This is done by using positioning means 8a, 8b which are located on the trailers 6, 7 or on the tractor unit 10.

In an another embodiment of the invention, loading the wind turbine component 5 to the vehicle is done by first lifting up the support structure 2 and then connecting the end frames therewith. Thus, loading the component 5 comprises the following steps.

The wind turbine component 5 is first connected separately to the support structure 2. After that, the first end frame 1 is detachably attached to the first trailer 6 and the second end frame 2 is detachably attached to the second trailer 7.

Then, the support structure 2 is lifted up from the ground using the positioning means 8a, 8b and afterwards the end frames 1, 3 are connected to this support structure 2. The positioning means 8a, 8b for lifting up the support structure 2 can be located on the trailers 6, 7 or on the tractor unit 10 and even external positioning means could be used.

In order to upload the wind turbine component 5, the support structure 2 and the component 5 connected therewith can be lowered and set down to the ground by activating the positioning means 8a, 8b again.

The support structure 2 with the wind turbine component 5 connected therewith can be further transported by other transportation means including ships, trains or trailer trucks. Thereby, the wind turbine component 5 can be reloaded while remaining connected to the support structure 2.

In another preferred embodiment of the invention, the adapter 4 comprises a bedding plate 9 which is connected to the support structure 2. The bedding plate 9 facilitates positioning of the wind turbine component 5 on the support structure 2. Besides the bedding plate 9 supports retaining the component 5 in a particular position while the component is transported.

The bedding plate 9 is detachably connected to the support structure 2 and the wind turbine component 5 is either detachably connected to the bedding plate 9 or it simply rests on this bedding plate 9.

Figure 2:
FIG. 2 shows a kind of end frames in relation to FIG. 1
Figure 3:
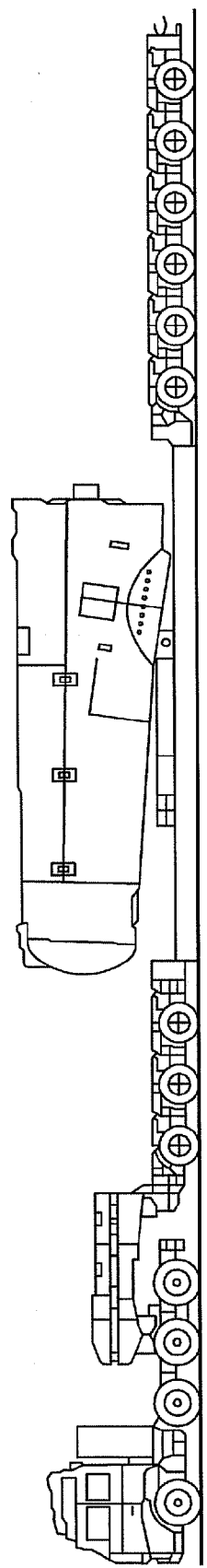
FIG. 3 shows a prior art system described in the introductory part of this patent application.

In FIG. 2 a set of end frames 1, 3 is shown. It becomes apparent from this figure that according to the invention the end frames 1 and 3 do not necessarily have to have the same shape and dimension.

In fact, the shapes and dimensions of the end frames 1, 3 can be different. Thereby, the first end frame 1 is designed to be connected to one end of the support structure 2 while the second end frame 3 is designed to be connected to the other end of the support structure 2.

In yet a further embodiment of the invention, which is not shown in the drawings, the system differs from the system described hereinbefore by the fact that the first end frame 1 of the adapter system 4 is directly connected to a tractor unit 10 which can be a trailer tractor or a railway engine.

Thereby, the tractor unit 10 is connected to the first end frame 1 of the adapter system 4. The first end frame 1 is further connected to the support structure 2. This support structure 2 in turn is connected to the second end frame 3 and the second end frame 3 is connected to a trailer 7.

In addition, positioning means 8a, 8b can be provided on the tractor unit 10 as well as on the trailer 7. These positioning means 8a, 8b are adapted to be connected to the end frames 1, 3.

The invention claimed is:

1. A vehicle for transporting wind turbine components, comprising:
   a first wheelset and a second wheelset;
   a first end frame connected to the first wheelset;
   a second end frame connected to the second wheelset;
   a support structure comprising a supporting plate for carrying a wind turbine component; and
   a bedding plate detachably connected to the supporting plate of the support structure for facilitating a positioning of the wind turbine component,
   wherein the support structure is connected to the first end frame and/or to the second end frame in a fixed but detachable manner, and
   wherein the wind turbine component is connected solely to the support structure in a fixed but detachable manner,
   wherein at least one of the wheelsets comprises a positioning device for lifting and/or lowering and/or turning the wind turbine component during transport, wherein at least one of the end frames is connected to the positioning device.

2. The vehicle according to claim 1, wherein the first end frame is connected to the first wheelset in a fixed but detachable manner.

3. The vehicle according to claim 1, wherein the second end frame is connected to the second wheelset in a fixed but detachable manner.

4. The vehicle according to claim 1, wherein the first end frame is connected to the first wheelset in a fixed but detachable manner, and wherein the second end frame is connected to the second wheelset in a fixed but detachable manner.

5. The vehicle according to claim 1, wherein the positioning device comprises hydraulical and/or electrical and/or pneumatical means.

6. The vehicle according to claim 1, wherein the wind turbine component is adapted to either be detachably connected to the bedding plate or simply rest on the bedding plate.

7. The vehicle according to claim 1, wherein the wheelsets are adapted to be connected directly to each other for further transport.

8. The vehicle according to claim 1, wherein a set of support structures with different dimensions is adapted to transport the wind turbine component selected from the group consisting of nacelles, tower sections, rotor blades, and a combination thereof.

9. The vehicle according to claim 1,
wherein the first wheelset forms part with a first trailer, and
wherein the second wheelset forms part with a second trailer.

10. The vehicle according to claim 1,
wherein the first wheelset forms part with a towing vehicle, and
wherein the second wheelset forms part with a trailer.

* * * * *